United States Patent
Keating et al.

(10) Patent No.: US 8,755,794 B2
(45) Date of Patent: Jun. 17, 2014

(54) SYSTEM AND METHOD OF SHARING INFORMATION BETWEEN WIRELESS DEVICES

(75) Inventors: Virgina Walker Keating, San Diego, CA (US); Joel Bernarte, San Diego, CA (US); Mitchell B. Oliver, San Diego, CA (US); Richard Lankford, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 981 days.

(21) Appl. No.: 12/328,842

(22) Filed: Dec. 5, 2008

(65) Prior Publication Data
US 2010/0144328 A1 Jun. 10, 2010

(51) Int. Cl.
*H04W 88/02* (2009.01)
(52) U.S. Cl.
USPC ...................................... 455/432.3
(58) Field of Classification Search
USPC ........ 455/432.3, 461; 707/783, 784, 785, 786
See application file for complete search history.

(56) References Cited

U.S. PATENT DOCUMENTS

| | | | |
|---|---|---|---|
| 7,552,862 B2 | 6/2009 | Flake et al. | |
| 2005/0120084 A1 | 6/2005 | Hu et al. | |
| 2007/0100652 A1* | 5/2007 | Ramer et al. | 705/1 |
| 2007/0100653 A1* | 5/2007 | Ramer et al. | 705/1 |
| 2007/0106753 A1* | 5/2007 | Moore | 709/217 |
| 2007/0239722 A1 | 10/2007 | Phillips | |
| 2008/0046979 A1 | 2/2008 | Oulahal | |
| 2008/0132251 A1 | 6/2008 | Altman et al. | |
| 2008/0133677 A1 | 6/2008 | Pattabhiraman et al. | |
| 2008/0219283 A1 | 9/2008 | Eom et al. | |
| 2008/0235191 A1 | 9/2008 | Dijk et al. | |

FOREIGN PATENT DOCUMENTS

| | | |
|---|---|---|
| CN | 101233516 A | 7/2008 |
| JP | 2007158760 A | 6/2007 |
| JP | 2007235866 A | 9/2007 |
| KR | 20070030942 A | 3/2007 |
| KR | 20080081632 A | 9/2008 |
| KR | 100862748 B1 | 10/2008 |
| WO | 2007037842 A2 | 4/2007 |

OTHER PUBLICATIONS

International Preliminary Report on Patentability—PCT/US2009/065904, The International Bureau of WIPO—Geneva, Switzerland, Mar. 7, 2011.
International Search Report & Written Opinion—PCT/US2009/065904, International Search Authority—European Patent Office—Mar. 26, 2010.

* cited by examiner

*Primary Examiner* — Diane Mizrahi
(74) *Attorney, Agent, or Firm* — Fariba Yadegar-Bandari

(57) ABSTRACT

A method of receiving a user profile at a wireless device is provided. The method includes receiving a request to add the user profile at the wireless device, transmitting an acceptance of the request, receiving the user profile at the wireless device, and storing the user profile at the wireless device.

50 Claims, 9 Drawing Sheets

SYSTEM AND METHOD OF SHARING INFORMATION BETWEEN WIRELESS DEVICES

The present invention generally relates to the operation of data networks, and more particularly, to systems and methods for sharing information between wireless devices.

DESCRIPTION OF THE RELATED ART

Advances in technology have resulted in the development and deployment of extensive data networks. These networks include both public data networks, such as the Internet, and specialized networks, such as wireless telecommunication networks. Users of these networks have the ability to access a wide variety of information and services that are available as network resources.

One example where there is an increasing demand for network resources is in wireless network environments. In wireless environments, a variety of wireless devices, such as wireless telephones, personal digital assistants (PDAs), and paging devices, communicate over a wireless network. The wireless network may also include network servers that operate to provide various network resources to the wireless devices. Furthermore, the wireless networks may also be coupled to a public network, such as the Internet, so that resources on the public network can be made available to the wireless devices on the wireless network.

Some of the devices, such as wireless telephones, are perceived as socially disruptive due to inappropriate user behavior. For example, answering a call during a meeting can be viewed by some as inappropriate. Additionally, contact information stored in a wireless device can be created by the owner of the wireless telephone and not by the contact associated with the contact information. Moreover, many of these wireless devices are powered on twenty four hours a day seven days a week (24/7) and as such, device presence, i.e., connected to a network, has very little meaning.

Accordingly, there exists a need for a system and method for addressing these deficiencies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to one aspect, a method of receiving a user profile at a wireless device is provided. The method includes receiving a request to add the user profile at the wireless device, transmitting an acceptance of the request, receiving the user profile at the wireless device, and storing the user profile at the wireless device.

In another aspect, a wireless device is provided. The wireless device includes a processor and a memory accessible to the processor. The memory includes at least one instruction for receiving a request to add the user profile at the wireless device, at least one instruction for transmitting an acceptance of the request, at least one instruction for receiving the user profile at the wireless device, and at least one instruction for storing the user profile at the wireless device.

In yet another aspect, another wireless device is provided. The wireless device includes means for receiving a request to add the user profile at the wireless device, means for transmitting an acceptance of the request, means for receiving the user profile at the wireless device, and means for storing the user profile at the wireless device.

In still another aspect, a computer program product including a computer-readable medium is provided. The computer-readable medium includes at least one instruction for receiving a request to add the user profile at the wireless device, at least one instruction for transmitting an acceptance of the request, at least one instruction for receiving the user profile at the wireless device, and at least one instruction for storing the user profile at the wireless device.

In another aspect, a method of transmitting a user profile to a wireless device is provided. The method includes transmitting a request to add a user profile to a remote wireless device, receiving a response from the remote wireless device, determining whether the request is accepted, and transmitting the user profile when the request is accepted.

In yet another aspect, a wireless device is provided. The wireless device includes a processor and a memory accessible to the processor. The memory includes at least one instruction for transmitting a request to add a user profile to a remote wireless device, at least one instruction for receiving a response from the remote wireless device, at least one instruction for determining whether the request is accepted, and at least one instruction for transmitting the user profile when the request is accepted.

In still another aspect, another wireless device is provided. The wireless device includes means for transmitting a request to add a user profile to a remote wireless device, means for receiving a response from the remote wireless device, means for determining whether the request is accepted, and means for transmitting the user profile when the request is accepted.

In yet still another aspect, a computer program product including a computer-readable medium is provided. The computer-readable medium includes at least one instruction for transmitting a request to add a user profile to a remote wireless device, at least one instruction for receiving a response from the remote wireless device, at least one instruction for determining whether the request is accepted, and at least one instruction for transmitting the user profile when the request is accepted.

In another aspect, a method of managing user profiles at a server is provided. The method includes receiving a user profile from a first wireless device, receiving notice that a second wireless device accepts a request to add the user profile, and transmitting the user profile to the second wireless device.

In yet another aspect, a server for managing user profiles associated with wireless devices that includes a processor and a memory accessible to the processor is provided. The memory includes at least one instruction for receiving a user profile from a first wireless device, at least one instruction for receiving notice that a second wireless device accepts a request to add the user profile, and at least one instruction for transmitting the user profile to the second wireless device.

In still another aspect, a server for managing user profiles associated with the wireless devices is provided. The server includes means for receiving a user profile from a first wireless device, means for receiving notice that a second wireless device accepts a request to add the user profile, and means for transmitting the user profile to the second wireless device.

In still yet another aspect, a computer program product including a computer-readable medium is provided. The computer-readable medium includes at least one instruction for receiving a user profile from a first wireless device, at least one instruction for receiving notice that a second wireless device accepts a request to add the user profile, and at least one instruction for transmitting the user profile to the second wireless device. In another aspect, a method of communicating with one or more wireless devices is provided. The method includes receiving a selection of a first target wireless device, determining current conditions associated with the first target wireless device, and at least partially based on the current conditions associated with the first target wireless device, determining how to contact the first target wireless device.

In still another aspect, a wireless device including a processor and a memory accessible to the processor is provided. The memory includes at least one instruction for receiving a selection of a first target wireless device, at least one instruction for determining current conditions associated with the first target wireless device, and at least one instruction for determining how to contact the first target wireless device at least partially based on the current conditions associated with the first target wireless device.

In yet another aspect, a wireless device is provided. The wireless device includes means for receiving a selection of a first target wireless device, means for determining current conditions associated with the first target wireless device, and means for determining how to contact the first target wireless device at least partially based on the current conditions associated with the first target wireless device.

In yet still another aspect, a computer program product including a computer-readable medium is provided. The computer-readable medium includes at least one instruction for receiving a selection of a first target wireless device, at least one instruction for determining current conditions associated with the first target wireless device, and at least one instruction for determining how to contact the first target wireless device at least partially based on the current conditions associated with the first target wireless device.

In another aspect, a method of initiating contact with a wireless device is provided. The method includes receiving a selection of a group of target wireless devices, determining current conditions associated with each of the group of target wireless devices, and at least partially based on the current conditions associated with each of the group of target wireless devices, determining a closest target wireless device from the group of target wireless devices.

In yet another aspect, a wireless device is provided. The wireless device includes a processor and a memory accessible to the processor. The memory includes at least one instruction for receiving a selection of a group of target wireless devices, at least one instruction for determining current conditions associated with each of the group of target wireless devices, and at least one instruction for determining a closest target wireless device from the group of target wireless devices at least partially based on the current conditions associated with each of the group of target wireless devices.

In still another aspect, a wireless device is provided. The wireless device includes means for receiving a selection of a group of target wireless devices, means for determining current conditions associated with each of the group of target wireless devices, and means for determining a closest target wireless device from the group of target wireless devices at least partially based on the current conditions associated with each of the group of target wireless devices.

In yet still another aspect, a computer program product including a computer-readable medium is provided. The computer-readable medium includes at least one instruction for receiving a selection of a group of target wireless devices, at least one instruction for determining current conditions associated with each of the group of target wireless devices, and at least one instruction for determining a closest target wireless device from the group of target wireless devices at least partially based on the current conditions associated with each of the group of target wireless devices.

In another aspect, a method of initiating contact with at least one wireless device is provided. The method includes receiving a selection of a current condition and determining whether any wireless devices in a contact list have a current condition that matches a selected current condition.

In still another aspect, a wireless device including a processor and a memory accessible to the processor is provided. The memory includes at least one instruction for receiving a selection of a current condition and at least one instruction for determining whether any wireless devices in a contact list have a current condition that matches a selected current condition.

In yet another aspect, a wireless device is provided. The wireless device includes means for receiving a selection of a current condition, and means for determining whether any wireless devices in a contact list have a current condition that matches a selected current condition.

In still yet another aspect, a computer program product including a computer-readable medium is provided. The computer-readable medium includes at least one instruction for receiving a selection of a current condition and at least one instruction for determining whether any wireless devices in a contact list have a current condition that matches a selected current condition.

BRIEF DESCRIPTION OF THE DRAWINGS

In the figures, like reference numerals refer to like parts throughout the various views unless otherwise indicated.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

In the following description, for purposes of explanation, numerous specific details are set forth in order to provide a thorough understanding of one or more aspects. It can be evident, however, that such aspect(s) can be practiced without these specific details. In other instances, well-known structures and devices are shown in block diagram form in order to facilitate describing one or more aspects.

In this description, the term "application" may also include files having executable content, such as object code, scripts, byte code, markup language files, and patches. In addition, an "application" referred to herein, may also include files that are not executable in nature, such as documents that may need to be opened or other data files that need to be accessed.

The term "content" may also include files having executable content, such as object code, scripts, byte code, markup language files, and patches. In addition, an "content" referred to herein, may also include files that are not executable in nature, such as documents that may need to be opened or other data files that need to be accessed.

In this description, the terms "communication device," "wireless device," and "wireless communications device" are used interchangeably. With the advent of third generation (3G) wireless technology, more bandwidth availability has enabled more electronic devices with wireless capabilities. Therefore, in a non-limiting aspect, a wireless device could be a cellular telephone, a pager, a PDA, a smartphone, a navigation device, a computer with a wireless connection, or any other mobile device with a processor, a memory, and a wireless network interface.

Figure 1:
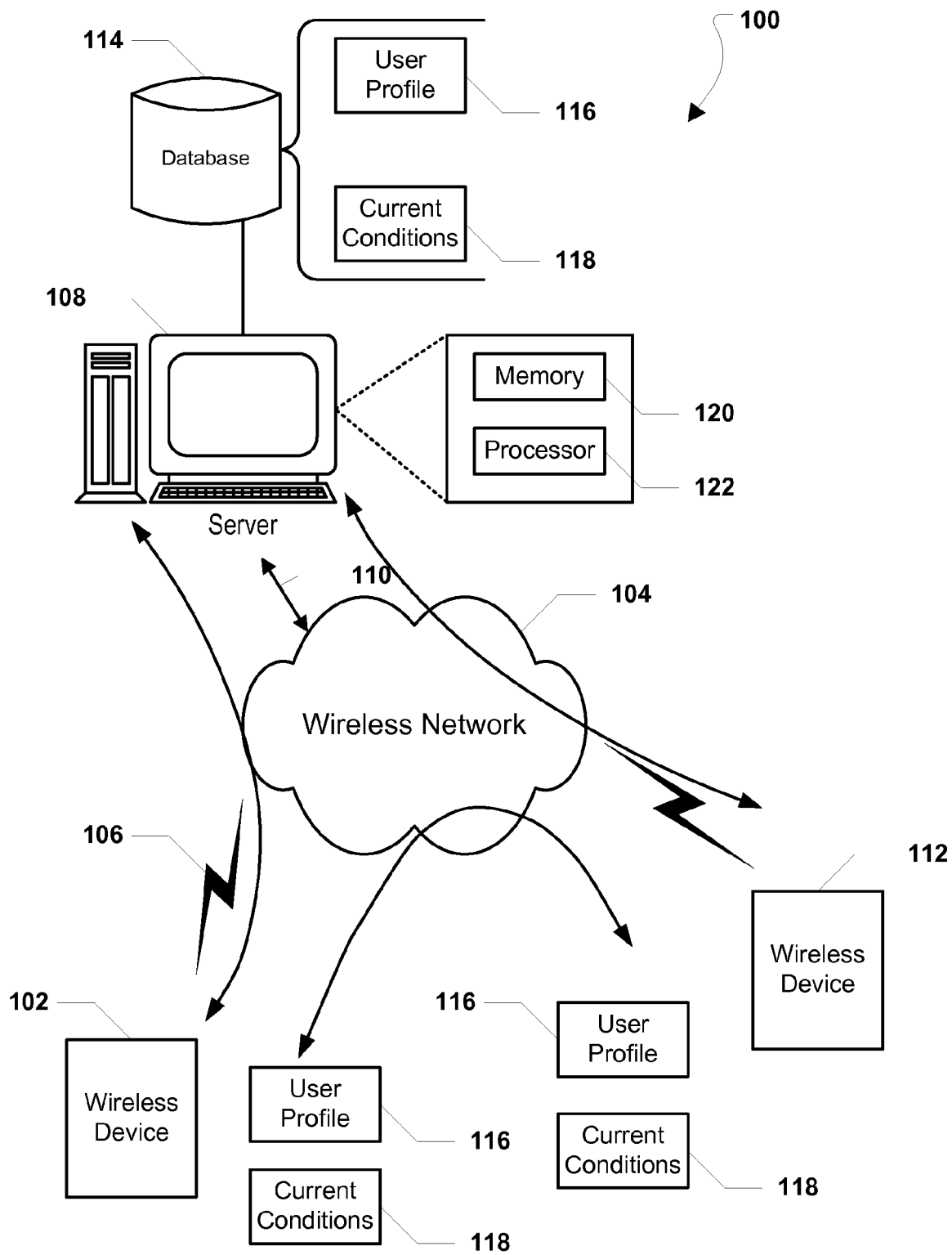
FIG. 1 is a diagram of a data network, according to one aspect.

FIG. 1 shows an exemplary communication system 100 through which a plurality of wireless devices can communicate with each other according to one or more of the methods described herein. The system 100 can include a first wireless device 102 that can communicate with a wireless data network 104 via a wireless communication channel 106. The system 100 can also include a server 108 that operates to provide services to the wireless device 102 and other entities in communication with the network 104. The server 108 can include a processor 120 and a memory 122. One or more of the method steps described herein can be stored in the memory. Further, the processor can act as a means for executing the one or more method steps stored in the memory.

The server 108 can be coupled to the network 104 by link 110, which may be any type of wired or wireless link. For example, in one aspect, the wireless device 102 may be a wireless telephone, and the server 108 may be part of a nationwide telecommunications network that provides applications, multimedia content, user profiles, current conditions, or a combination thereof to the first wireless device 102.

A second wireless device 112 can also be coupled to the network 104. The second wireless device 112 can be located remotely from the first wireless device 102, but the second wireless device 112 can be accessed by, and in communication with, the first wireless device 102 via the wireless network 104. FIG. 1 also shows a database 114 that can be connected to the server 108. The database 114 can include applications, multimedia content, user profiles 116, current conditions 118, or a combination thereof.

During operation of the system according to one aspect, the user of the second wireless device 112 can create a user profile 116. Then, the user of the second wireless device 112 can transmit a request to the user of the first wireless device 102 to accept the user profile 116. If the user of the first wireless device 102 accepts, the user profile can be transmitted directly to the first wireless device 102 from the second wireless device 112 via the wireless network 104. Alternatively, the user profile 116 can be transmitted from the server 108 to the first wireless device 102 via the wireless network 104. Further, the first wireless device 102 can periodically receive current conditions, described below, associated with the second wireless device 112. The current conditions can be received directly from the second wireless device 112 via the wireless network 104. Alternatively, the current conditions can be received from the server 108 via the wireless network 104.

Figure 2:
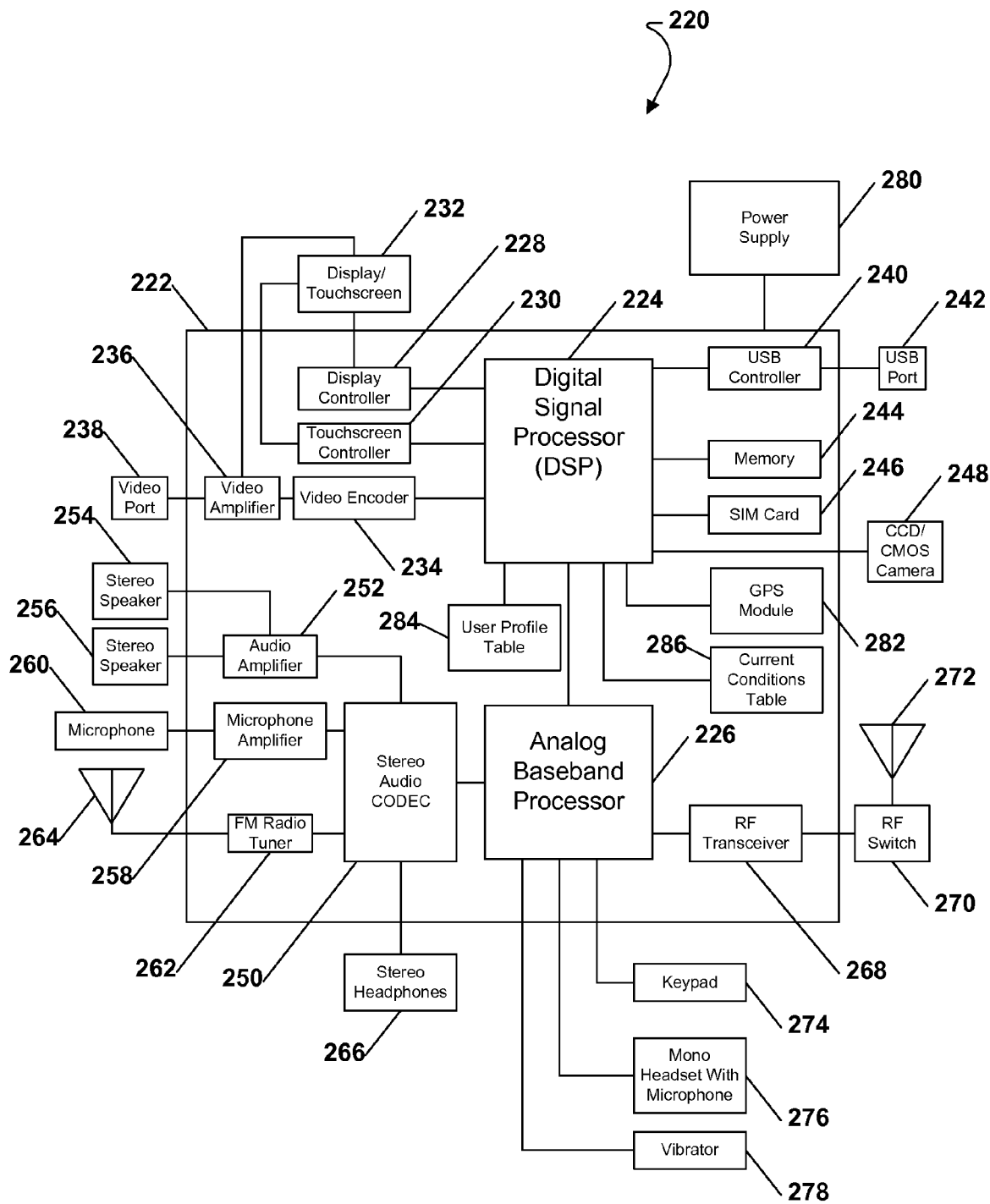
FIG. 2 is a diagram of a wireless device, according to another aspect.

Referring to FIG. 2, an exemplary, non-limiting aspect of a wireless device is shown, according to one aspect, and is generally designated 220. As shown, the wireless device 220 includes an on-chip system 222 that includes a digital signal processor 224 and an analog baseband processor 226 that are coupled together. The processors 224, 226 alone, or in conjunction, can serve as a means for executing one or more of the method steps described herein. Each method can be executed singularly or in combination with other methods, or steps from other methods, described herein. As illustrated in FIG. 2, a display controller 228 and a touchscreen controller 230 are coupled to the digital baseband processor 224. In turn, a touchscreen display 232 external to the on-chip system 222 is coupled to the display controller 228 and the touchscreen controller 230.

FIG. 2 further indicates that a video encoder 234, e.g., a phase alternating line (PAL) encoder, a sequential couleur a memoire (SECAM) encoder, or a national television system (s) committee (NTSC) encoder, is coupled to the digital baseband processor 224. Further, a video amplifier 236 is coupled to the video encoder 234 and the touchscreen display 232. Also, a video port 238 is coupled to the video amplifier 236. As depicted in FIG. 2, a universal serial bus (USB) controller 240 is coupled to the digital baseband processor 224. Also, a USB port 242 is coupled to the USB controller 240. A memory 244 and a subscriber identity module (SIM) card 246 can also be coupled to the digital baseband processor 224. Further, as shown in FIG. 2, a digital camera 248 can be coupled to the digital baseband processor 224. In an exemplary aspect, the digital camera 248 is a charge-coupled device (CCD) camera or a complementary metal-oxide semiconductor (CMOS) camera.

As further illustrated in FIG. 2, a stereo audio CODEC 250 can be coupled to the analog baseband processor 226. Moreover, an audio amplifier 252 can be coupled to the stereo audio CODEC 250. In an exemplary aspect, a first stereo speaker 254 and a second stereo speaker 256 are coupled to the audio amplifier 252. FIG. 2 shows that a microphone amplifier 258 can be also coupled to the stereo audio CODEC 250. Additionally, a microphone 260 can be coupled to the microphone amplifier 258. In one particular aspect, a frequency modulation (FM) radio tuner 262 can be coupled to the stereo audio CODEC 250. Also, an FM antenna 264 is coupled to the FM radio tuner 262. Further, stereo headphones 266 can be coupled to the stereo audio CODEC 250.

FIG. 2 further indicates that a radio frequency (RF) transceiver 268 can be coupled to the analog baseband processor 226. An RF switch 270 can be coupled to the RF transceiver 268 and an RF antenna 272. As shown in FIG. 2, a keypad 274 can be coupled to the analog baseband processor 226. Also, a mono headset with a microphone 276 can be coupled to the analog baseband processor 226. Further, a vibrator device 278 can be coupled to the analog baseband processor 226. FIG. 2 also shows that a power supply 280 can be coupled to the on-chip system 222. In a particular aspect, the power supply 280 is a direct current (DC) power supply that provides power to the various components of the wireless device 220 that require power. Further, in a particular aspect, the power supply is a rechargeable DC battery or a DC power supply that is derived from an alternating current (AC) to DC transformer that is connected to an AC power source.

In a particular aspect, the wireless device 220 can include a global positioning system (GPS) module 282 coupled to the DSP 224 or the analog baseband processor 226. The GPS module 284 and at least one of the processors 224, 226 can provide a means for locating the wireless device 220.

Further, as illustrated in FIG. 2, the wireless device 220 can include a user profile table 284 in which one or more user profiles associated with one or more contacts can be stored, accessed, etc. Also, the wireless device 220 can include a current conditions table 286 in which current conditions associated with the wireless device of one or more of the contacts can be stored, accessed, etc.

As depicted in FIG. 2, the touchscreen display 232, the video port 238, the USB port 242, the camera 248, the first stereo speaker 254, the second stereo speaker 256, the microphone 260, the FM antenna 264, the stereo headphones 266, the RF switch 270, the RF antenna 272, the keypad 274, the mono headset 276, the vibrator 278, and the power supply 280 are external to the on-chip system 222.

Figure 3:
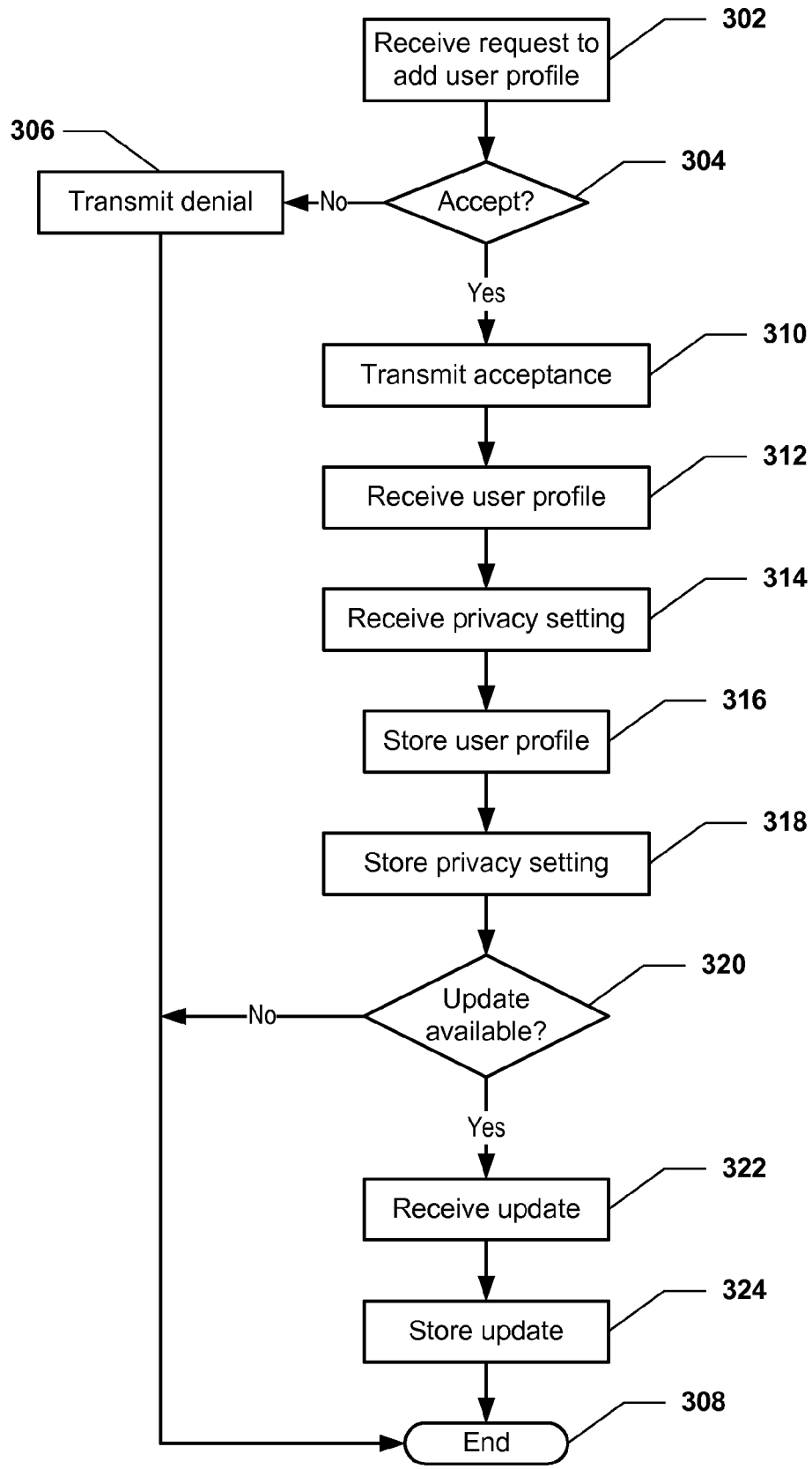
FIG. 3 is a flowchart illustrating a method of receiving a user profile at a wireless device, according to yet another aspect.

Referring to FIG. 3, in accordance with one implementation, a method of receiving a user profile, or contact information, is shown and commences at block 302. In a particular aspect, a user profile can include a home telephone phone number, a work phone number, a mobile telephone number, a facsimile telephone number, a work email address, a private email address, an instant messaging (IM) name, a social network contact, or a combination thereof. The user profile can include a home address, a work address, or a combination thereof. Further, the user profile can include a user created or user selected photo, a user created or user selected avatar, or a combination thereof. Also, the user profile can include additional content, such as text, calendar events, a to-do list, or a combination thereof. The user profile can also include current conditions associated with the user device associated with the user profile.

Returning to the description of the method, at block 302, a request to add a user profile can be received at a wireless device. The request can be sent, or otherwise transmitted, from an initiating wireless device and received at a receiving wireless device. At 304, it can be determine whether the user of the receiving wireless device desires to accept the request. For example, a prompt can be presented to the user via the display of the receiving wireless device and the user can indicate whether or not he or she wishes to accept the request, e.g., by toggling a first button corresponding to a yes or toggling a second button corresponding to a no. At 304, if the user does not want to accept the user profile, the method can move to block 306 and the receiving wireless device can transmit a denial, i.e., an indication that the user does not want to add the user profile to the receiving wireless device. Thereafter, the method can end at 308.

Conversely, at 304, if it is determined that the user does want to accept the request and add the user profile to the receiving wireless device, the method can continue to block 310. At block 310, the receiving wireless device can transmit an acceptance acknowledgement to the initiating wireless device. Then, at block 312, the receiving wireless device can receive the user profile from the initiating wireless device. Alternatively, the receiving wireless device can receive the user profile from a server connected to the wireless network. In such a case, the server can be instructed by the initiating wireless device to transmit the user profile to the receiving wireless device.

At block 314, the receiving wireless device can receive a privacy setting from the initiating wireless device. Alternatively, the receiving wireless device can receive the privacy setting from a server connected to the wireless network. In such a case, the server can be instructed by the initiating wireless device to transmit the privacy setting to the receiving wireless device. The privacy setting can indicate what level of access the receiving wireless device can have into the initiating wireless device, e.g., into the files, content, calendar information, contact information, or a combination thereof that is stored on or associated with the initiating wireless device.

Moving to block 316, the receiving wireless device can store the user profile received from the initiating wireless device. Further, at block 318, the receiving wireless device can store the privacy setting from the initiating wireless device. At 320, the receiving wireless device can determine whether an update to the user profile is available. For example, the receiving wireless device can initiate contact with a server that stores user profiles in order to determine if any updates are available. If no updates are available, the method can end at 308. On the other hand, if updates are available, the method can move to block 322 and the receiving wireless device can receive the updates. At block 324, the receiving wireless device can store the updates. The method can then end at 308.

Figure 4:
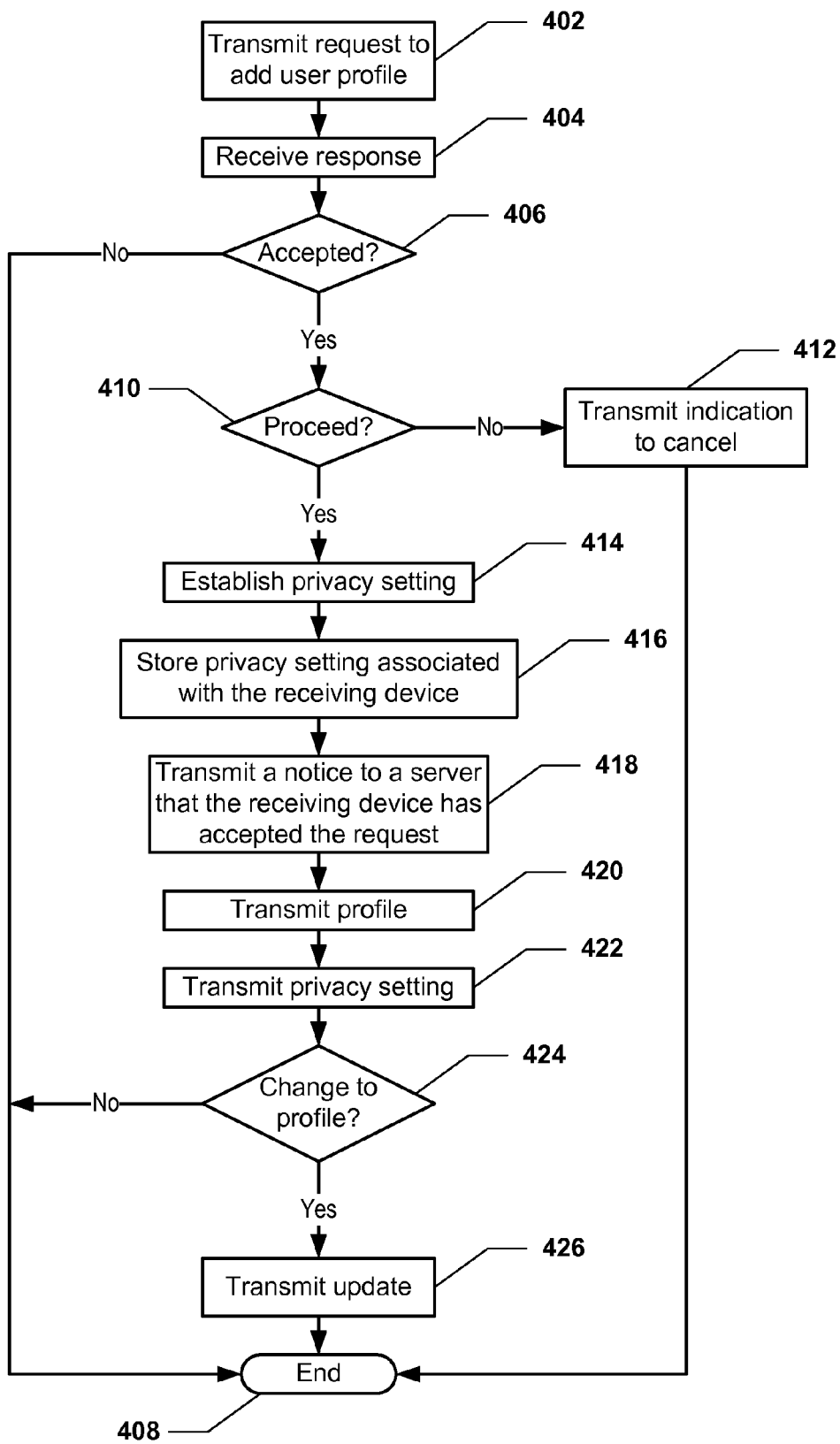
FIG. 4 is a flowchart illustrating a method of transmitting a user profile to a wireless device, according to still another aspect.

FIG. 4 illustrates a method of transmitting a user profile to a wireless device. Beginning at block 402, an initiating wireless device can transmit a request to a receiving wireless device to add a user profile to the receiving wireless device. At block 404, the initiating wireless device can receive a response. Moving to 406, the initiating wireless device can determine whether the request to add the user profile to the receiving wireless device is accepted. If not, the method can end at 408. Conversely, if the request is accepted, the method can move to 410 and the initiating wireless device can determine whether to proceed with the transaction, e.g., by prompting the user. If it is determined not to proceed with the transaction, the method can proceed to block 412 and the initiating wireless device can transmit an indication to cancel the transaction to the receiving wireless device. The method can then end at 408.

Returning to 410, if it is determined to proceed with the transaction, the method can continue to block 414. At block 414, a privacy setting can be established at the initiating wireless device. The privacy setting can indicate what level of access the receiving wireless device can have into the initiating wireless device, e.g., into the files or content stored on the initiating wireless device. For example, a low privacy setting can allow the receiving wireless device to have full access into the files or content stored on the initiating wireless device. A medium privacy setting can allow partial access into the files or content stored on the initiating wireless device. A high privacy setting can block access to all files or content stored on the initiating wireless device.

Moving to block 416, the privacy setting associated with the receiving device can be stored at the initiating device. Further, at block 418, the initiating device can transmit a notice to a server that the receiving device has accepted the request. The notice can also include the user profile and the privacy setting associated with the designated receiving wireless device. At block 420, the user profile can be transmitted to the receiving wireless device. The user profile can be transmitted directly from the initiating device to the receiving wireless device. Also, the user profile can be transmitted from the initiating wireless device to the server and from the server to the receiving wireless device, e.g., after instructed by the initiating wireless device.

At block 422, the privacy setting can be transmitted to the receiving wireless device. The privacy setting can be transmitted directly from the initiating device to the receiving wireless device. Also, the privacy setting can be transmitted from the initiating wireless device to the server and from the server to the receiving wireless device, e.g., after instructed by the initiating wireless device. Continuing to 424, the initiating wireless device can determine whether any changes have been made to the user profile by the user of the initiating wireless device. If no changes are made, the method can end at 408. On the other hand, if changes are made, the method can move to block 426 and the initiating wireless device can transmit updates to the user profile to a server that stores one or more user profiles. The server can then push the updates to all wireless devices that were designated by the initiating wireless device to receive the user profile. The update can also be transmitted directly from the initiating wireless device to the receiving wireless device, or multiple receiving wireless devices that previously accepted the user profile. The method can end at 408.

Figure 5:
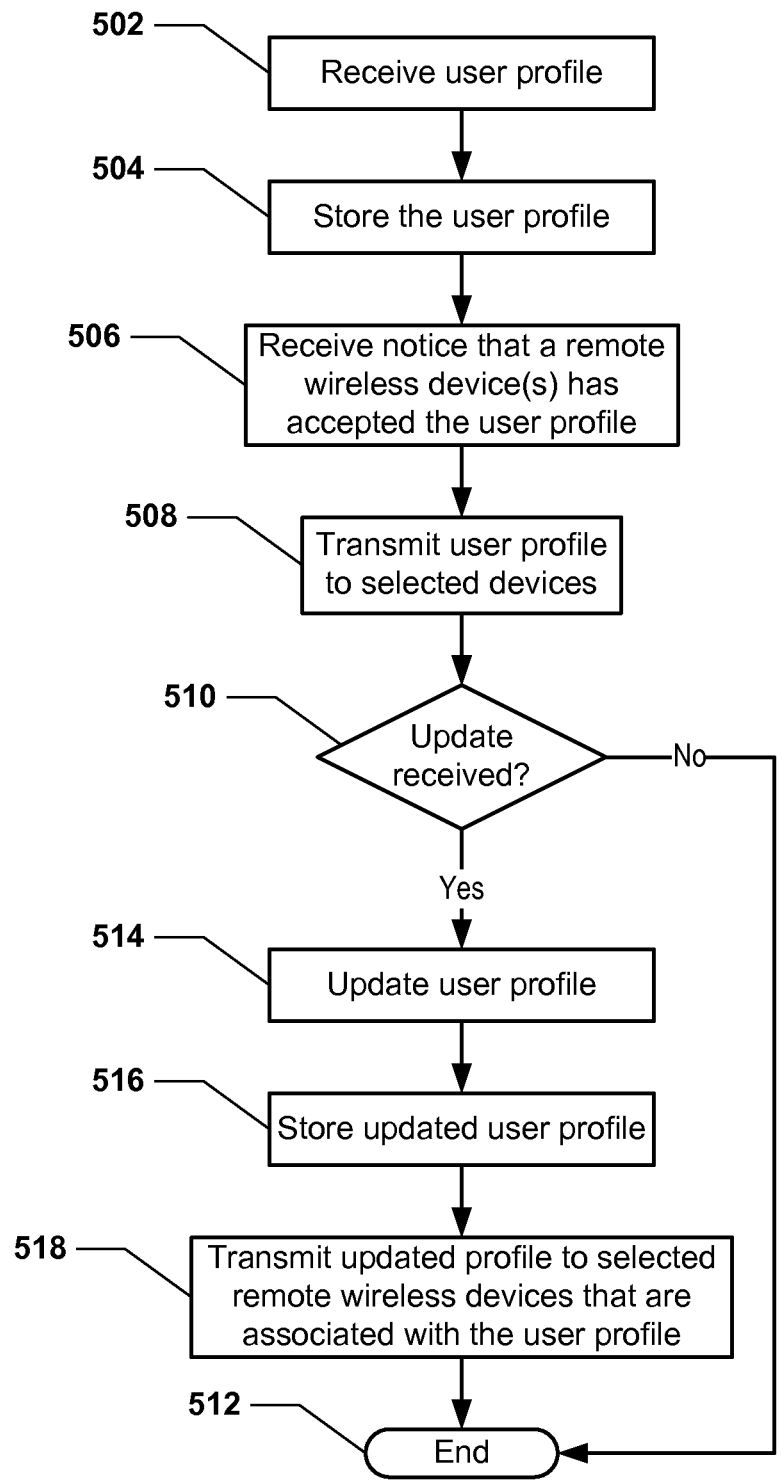
FIG. 5 is an exemplary flowchart illustrating a method of managing user profiles at a server, according to still another aspect.

Referring now to FIG. 5, according to one aspect, a method of managing user profiles at a server is shown and commences at block 502. At block 502, the server can receive a user profile, e.g., from an initiating wireless device. At block 504, the server can store the user profile. The server can store the user profile with an associated user name, telephone number, or other similar identifier. Also, the server can store the user profile with an associated communication identifier (CommID). Using the CommID the server can have the ability to track users even if the user changes his or her name, telephone number, carrier, or a combination thereof. At block 506, the server can receive a notice that a remote wireless device, or devices, has accepted the user profile from the initiating wireless device. The notice can also include a privacy setting and an instruction to push the user profile and the privacy setting to designated receiving wireless devices.

At block 508, the server can transmit the user profile to selected receiving wireless devices. Proceeding to 510, the server can determine whether any updates to the user profile are received. If no updates are received, the method can end at 512. Conversely, if updates are received, the method can move to block 514 and the server can update the user profile. In a particular aspect, the update can include a time stamp in order to accurately track the most recent updates. Accordingly, in the event that a receiving wireless device has not received a series of updates, the receiving wireless devices may only receive the most recent version of a user profile. Moving to block 516, the server can stored the updated user profile. Then, at block 518, the server can transmit the updated profile to selected receiving, or remote, wireless devices that are associated with the user profile and that were previously designated to receive the original user profile. Then, method can end at 508.

Figure 6:
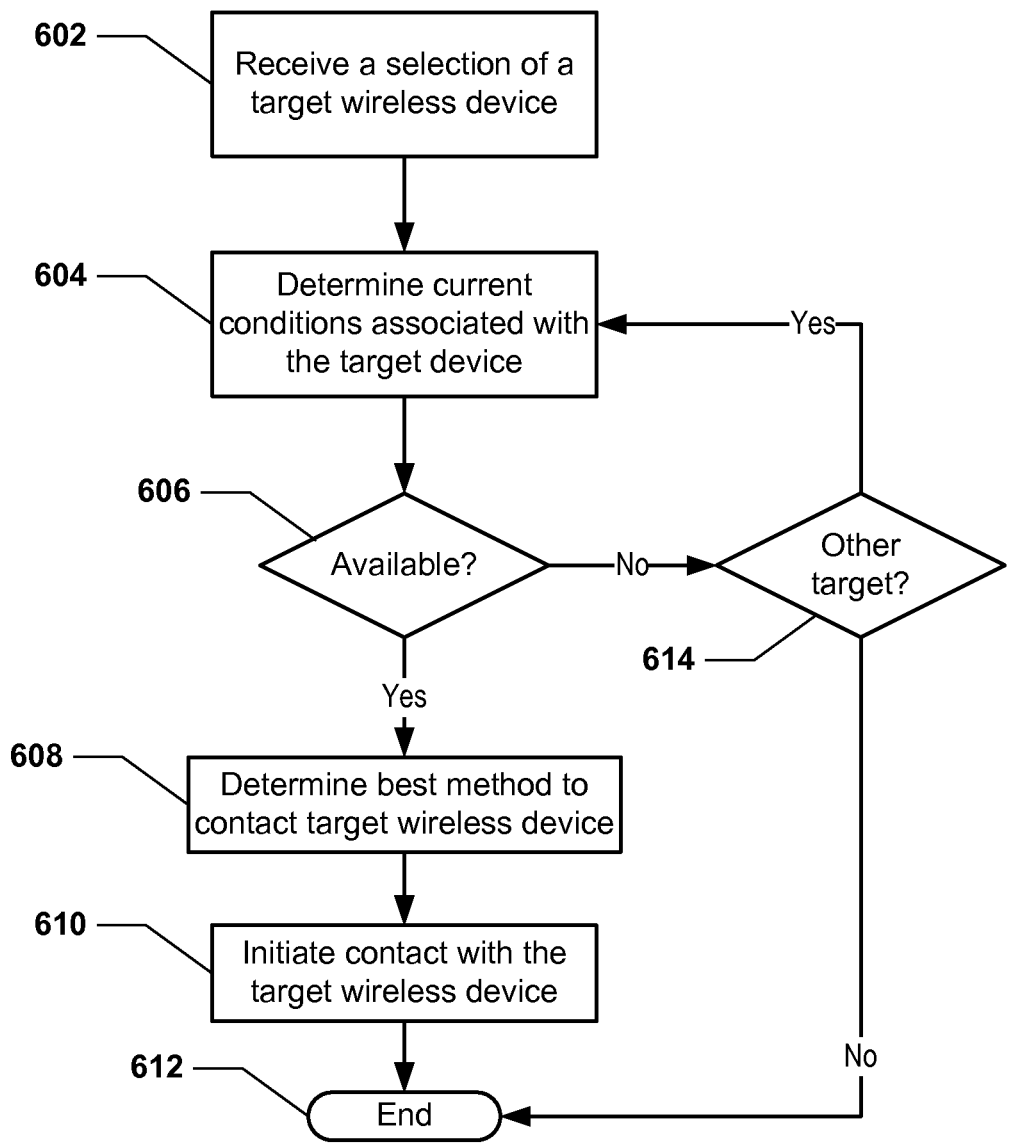
FIG. 6 is an exemplary flowchart illustrating a method of communicating with one or more wireless devices based on current conditions associated with each of the one or more wireless devices, according to yet another aspect.

FIG. 6 depicts a method of communicating with one or more wireless devices, according to one aspect. Starting at block 602, a selection of a target wireless device can be received at an initiating wireless device. In other words, a user of an initiating wireless device can select a target wireless device from a list of contacts and attempt to initiate contact with the target wireless device. At block 604, the current conditions associated with the target device can be determined.

The current conditions can include a current location, a system set status (e.g., out of network, etc.), a mood (sad, happy, bored, etc.), a customized message, a user set status (e.g., do not disturb, etc.), a location set status (e.g., ringer off, etc.), a time based status (i.e., based on a schedule), a calendar based status, current phone settings (e.g., ringer off, etc.), recent behavior (e.g., missed last call, ignored last message, unchecked voice mail, etc.), weather, or a combination thereof. The initiating wireless device can present the information from the current conditions via a static or animated visual representation that can include a user selected, user created, user customized, or user purchased avatar that changes to reflect the current conditions associated with the target wireless device. The avatar can be a static avatar or a dynamic, i.e., animated, avatar that changes based on the current conditions.

The current conditions can include changes to the avatar that are random or theme based changes (e.g., sponsored changes—ecstatic expression at a theme park, etc.). The current conditions can also update the avatar based on a wardrobe set created by the user or system created. The avatar can change clothes based on the location of the target device and the current weather associated with the target device. Further, the current conditions can update the avatar so that the background of the avatar changes to reflect the conditions of the target wireless device. Further, the avatar can include a pet, a prop, or additional items that change based on the current conditions associated with the target wireless device. A history of avatar changes for a particular target wireless device can be maintained and can be accessed locally at the initiating device or by remote users by accessing a server/database in which the history is stored.

In a particular aspect, the current conditions can be part of a user profile and the current conditions can be updated on a regular basis. The current conditions can be user updated, e.g., a change in mood, etc. . . . Also, the current conditions can be system updated, e.g., a change in location, a change in local weather, a change in local time, etc.

Continuing to 606, at least partially based on the current conditions associated with the target wireless device, the initiating wireless device can determine whether the target wireless device is available. If so, the method can move to block 608 and the initiating wireless device can determine the best method to contact the target wireless device, e.g., at least partially based on the current conditions associated with the target wireless device. The method of contacting the target wireless device can include a text message (SMS), an instant message (IM), an email, a voice mail, a telephone call, etc., or a combination thereof. Proceeding to block 610, the initiating wireless device can initiate contact with the target wireless device. The method can then end at 612.

Returning to 606, if the target wireless device is not available, the method can move to 614. At 614, the initiating wireless device can determine whether the user of the initiating wireless device has indicated that another target wireless device should be contacted when the first target wireless device is not available. If so, the method can return to block 604 and continue as described herein. Otherwise, the method can end at 612.

Figure 7:
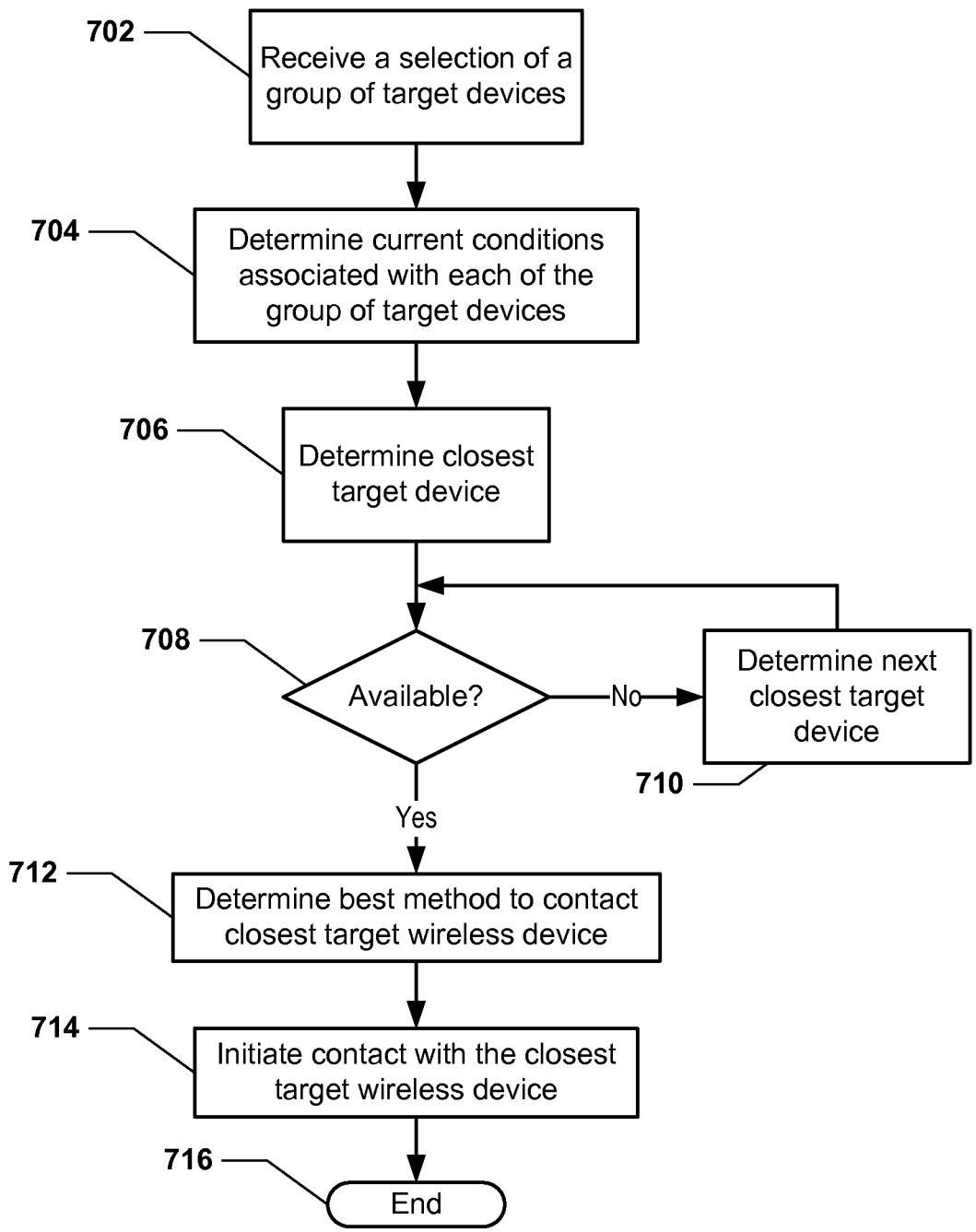
FIG. 7 is an exemplary flowchart illustrating a method of initiating contact with a wireless device based on current conditions associated with the wireless device, according to yet another aspect.

Referring to FIG. 7, a method of initiating contact with a wireless device is depicted, according to one aspect. Commencing at block 702, a selection of a group of target wireless devices can be received at an initiating wireless device. In other words, a user can select a group of favorites at the initiating wireless device. At block 704, the current conditions associated with each of the group of target devices can be determined.

At block 706, the initiating wireless device can determine which target wireless device in the group of target wireless devices is closest to the initiating wireless device. This determination can be made using location information received from each target wireless device in the most recent update to the user profile for each target wireless device. The location information can be determined using a global positioning system (GPS), triangulation, base station information, or a combination thereof.

Moving to 708, the initiating wireless device can determine whether the closest target wireless device is available, e.g., based on the current conditions associated with the closest target wireless device. If the closest target wireless device is not available, the method can proceed to block 710. At block 710, the initiating wireless device can determine the next closest target wireless device. The method can then return to 708 and continue as described herein.

Returning to 708, if the closest, or next closest, target wireless device is available, the method can continue to block 712. At block 712, the initiating wireless device can determine the best method to contact the closest available target wireless device. At block 714, the initiating wireless device can initiate contact with the closest available target wireless device. The method can then end at 716.

Figure 8:
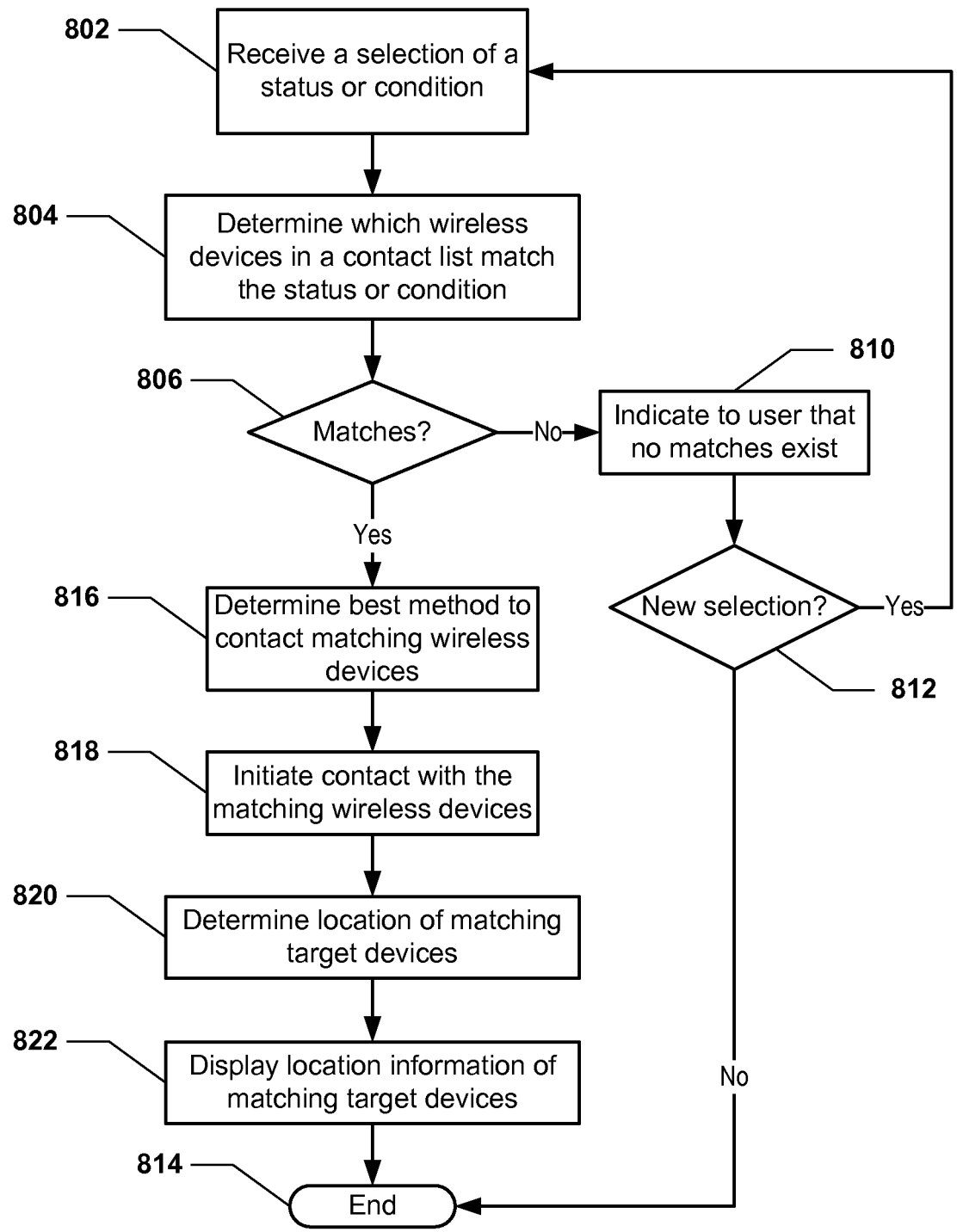
FIG. 8 is an exemplary flowchart illustrating a method of initiating contact with one or more wireless devices based on current conditions associated with each of the one or more wireless devices, according to one aspect.

FIG. 8 illustrates a method of initiating contact with one or more wireless devices based at least partially one or more conditions associated with the one or more wireless devices, in accordance with one aspect. Beginning at block 802, a selection of a condition can be received at an initiating wireless device. For example, the selection can be mood based, e.g., sad, happy, bored, chatty, miserable, etc. At block 804, the initiating wireless device can determine which target wireless devices in a contacts list have current conditions that match the selected condition. At 806, the initiating device can determine if any matches exist. If not, the method can move to block 810 and the device can indicate to the user that no matches exist. Then, at 812, it can be determined if a new selection is made. If so, the method can return to block 802 and continue as described herein. Otherwise, the method can end at 814.

Returning to 806, if one or more matches exist, the method can move to block 816. At block 816, the best method of contacting the matching wireless device can be determined based on the current conditions associated with each matching device. Thereafter, at block 818, the initiating wireless device can initiate contact, or communication, with the matching target wireless devices.

Moving to block 820, the location of each matching target wireless device can be determined, e.g., based on location information received with the current conditions associated with each matching target wireless device. At block 822, the location information of each matching target wireless device can be displayed. In a particular aspect, the location information can indicate how close each matching target wireless device is to the initiating wireless device. Specifically, the matching target wireless devices can be ranked from closest to farthest away or from farthest away to closest. Accordingly, the user of the initiating wireless device can determine which user of the matching target wireless device is closest in case the user of the initiating wireless device wants to physically meet the user of the closest matching target wireless device. The method can end at 814.

Figure 9:
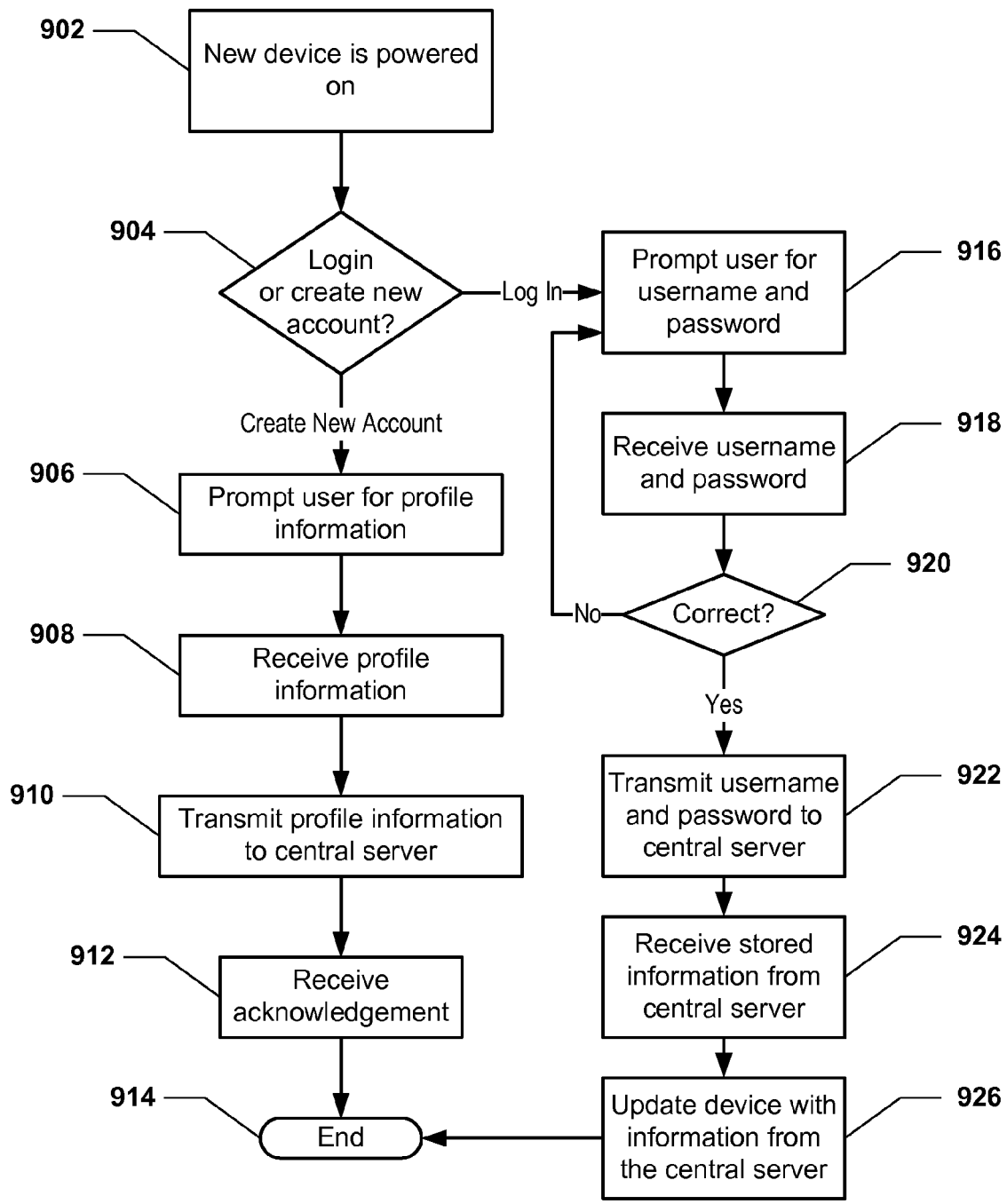
FIG. 9 is an exemplary flowchart illustrating a method of setting up a wireless device, according to another aspect.

Referring to FIG. 9, according to one aspect, a method of setting up a new wireless device is shown and commences at block 902. At block 902, the new device is powered on. At 904, the wireless device can prompt the user in order to determine whether the user desires to log into an existing account or create a new account. If the user chooses to create a new account, the method can move to block 906. At block 906, the user can be prompted to input profile information. The profile information can be input using a keypad, a keyboard, a touch sensitive display, a touch sensitive keyboard, or a combination thereof. At block 908, the wireless device can receive the profile information from the user. Further, at block 910, the wireless device can transmit the profile information to a server. Then, at block 912, an acknowledgement can be received from the server. The method can then end at 914.

Returning to 904, if the user chooses to log into an existing account, the method can move to block 916 and the wireless device can prompt the user to input a username and a password. At block 918, the username and password are received at the wireless device. Then, at block 920, the username and the password can be transmitted to a server. Moving to 922, it is determined whether the username and the password are correct, e.g., based on an indication from the server. If the username and/or the password are incorrect, the method can return to block 916 and the user can be prompted to re-enter the username and the password. Then, the method can return to block 918 and continue as described herein.

Returning to block 922, if the username and the password are correct, the method can continue to block 924 and stored information can be received from the server. The stored information can include one or more user profiles and current conditions associated with each of the one or more user profiles. At block 926, the wireless device can be updated with the information received from the server. Thereafter, the method can end at 914.

By sharing current conditions and user profiles using one or more of the methods described herein, the user of a device, the device itself, or the network can make intelligent contact decisions based on a remote user's current conditions and profile. For example, the current condition of the remote user can indicate that the remote user is in a meeting and cannot be disturbed by a phone call. Accordingly, the current condition can indicate to the initiating user to contact the remote user via text or instant messaging routed to the remote user's laptop computer. Each user can create his or her own user profile and disseminate the information to the user using the double opt in method described herein in conjunction with FIG. 4. Further, the responsibility to act according to the local conditions can be removed from the remote user and shifted to the user that initiates the contact. The initiating user can know before initiating contact with a remote user if that remote user can be contacted and if so, what is the best method of contacting the remote user.

Further, using one or more of the methods described herein, a child who is seeking a ride home can select a group of family members and the system can determine, based on the current conditions of each user, or user device, which user is closest and available to receive the child's request. As such, the child does not have to make the decision. His or her device can make the decision and initiate the contact accordingly. Also, using one or more of the methods described herein, a user can initiate contact with other users based solely on current conditions, e.g., mood. By selecting a mood, e.g., bored, the device and system can poll all users in a contact list that have a matching mood and initiate contact, e.g., a text session, with those users. Accordingly, the decision can be substantially more informed based on the current conditions of each user.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations can be made therein without departing from the spirit and scope of the present invention, as defined by the following claims.

What is claimed is:

1. A method of selectively receiving a user profile at a wireless device, the method comprising:
    receiving a request to add the user profile at the wireless device, the user profile being associated with at least one other device;
    selectively transmitting, based on an acceptance input, an acceptance of the request;
    receiving, in response to transmitting the acceptance of the request, the user profile at the wireless device; and
    storing the user profile at the wireless device.

2. The method of claim 1, wherein the user profile includes at least one of a home address, a work address, a photo, an avatar, calendar events, a to-do list, current conditions, or a combination thereof.

3. The method of claim 1, further comprising:
    receiving a privacy setting; and
    storing the privacy setting.

4. The method of claim 3, wherein the user profile is received from another wireless device and the privacy setting indicates a level of access for the wireless device into the another wireless device.

5. The method of claim 1, further comprising:
    determining whether an update to the user profile is available;
    receiving the update to the user profile, when available; and
    storing the update.

6. A wireless device, the wireless device comprising:
    a processor; and
    a memory accessible to the processor, the memory comprising:
        at least one instruction for receiving a request to add a user profile at the wireless device, the user profile being associated with at least one other device;
        at least one instruction for transmitting, based on an acceptance input, an acceptance of the request;
        at least one instruction for receiving, after transmitting the acceptance of the request, the user profile at the wireless device; and
        at least one instruction for storing the user profile at the wireless device.

7. The wireless device of claim 6, wherein the memory further comprises:
    at least one instruction for receiving a privacy setting; and
    at least one instruction for storing the privacy setting.

8. The wireless device of claim 6, wherein the memory further comprises:
    at least one instruction for determining whether an update to the user profile is available;
    at least one instruction for receiving the update to the user profile, when available; and
    at least one instruction for storing the update.

9. A wireless device, the wireless device comprising:
    means for receiving a request to add a user profile at the wireless device, the user profile being associated with at least one other device;
    means for selectively transmitting, based on an acceptance input, an acceptance of the request;
    means for receiving the user profile associated with the request and the transmitted acceptance, at the wireless device; and
    means for storing the user profile at the wireless device.

10. The wireless device of claim 9, further comprising:
    means for receiving a privacy setting; and
    means for storing the privacy setting.

11. The wireless device of claim 9, further comprising:
    means for determining whether an update to the user profile is available;
    means for receiving the update to the user profile, when available; and
    means for storing the update.

12. A non-transitory computer-readable medium comprising instructions, the instructions comprising:
    at least one instruction to receive a request to add a user profile at the wireless device, the user profile being associated with at least one other device;
    at least one instruction to transmit an acceptance of the request;
    at least one instruction to receive the user profile at the wireless device; and
    at least one instruction to store the user profile at the wireless device.

13. The non-transitory computer-readable medium of claim 12, further comprising:
    at least one instruction receive a privacy setting; and
    at least one instruction to store the privacy setting.

14. The non-transitory computer-readable medium of claim 12, further comprising:
    at least one instruction to determine whether an update to the user profile is available;
    at least one instruction to receive the update to the user profile, when available; and
    at least one instruction to store the update.

15. A method of transmitting a user profile to a wireless device, the method comprising:

transmitting a request to add the user profile to a remote wireless device, the user profile being associated with at least one other device;
receiving a response to the request from the remote wireless device;
determining from the response whether the request is accepted; and
transmitting the user profile in response to the request being accepted, the user profile to be stored in the remote wireless device.

16. The method of claim 15, further comprising:
establishing a privacy setting associated with the remote wireless device.

17. The method of claim 16, further comprising:
storing the privacy setting associated with the remote wireless device.

18. The method of claim 16, further comprising:
transmitting the privacy setting to the remote wireless device.

19. The method of claim 16, wherein the privacy setting indicates a level of access for the wireless device into another wireless device from which the user profile is received.

20. The method of claim 15, further comprising:
transmitting a notice to a server, wherein the notice indicates the remote wireless device accepted the request to add the user profile.

21. The method of claim 15, further comprising:
determining whether any changes are made to the user profile; and
transmitting an update to a server, when changes are made to the user profile, wherein the update includes the changes to the user profile.

22. A wireless device, the wireless device comprising:
a processor; and
a memory accessible to the processor, the memory comprising:
  at least one instruction for transmitting a request to add a user profile to a remote wireless device, the user profile being associated with at least one other device;
  at least one instruction for receiving a response from the remote wireless device;
  at least one instruction for determining from the response whether the request is accepted; and
  at least one instruction for transmitting the user profile in response to the request being accepted, the user profile to be stored in the remote wireless device.

23. The wireless device of claim 22, wherein the memory further comprises:
at least one instruction for establishing a privacy setting associated with the remote wireless device.

24. The wireless device of claim 23, wherein the memory further comprises:
at least one instruction for storing the privacy setting associated with the remote wireless device.

25. The wireless device of claim 23, wherein the memory further comprises:
at least one instruction for transmitting the privacy setting to the remote wireless device.

26. The wireless device of claim 22, wherein the memory further comprises:
at least one instruction for transmitting a notice to a server, wherein the notice indicates the remote wireless device accepted the request to add the user profile.

27. The wireless device of claim 22, wherein the memory further comprises:
at least one instruction for determining whether any changes are made to the user profile; and
at least one instruction for transmitting an update to a server, when changes are made to the user profile, wherein the update includes the changes to the user profile.

28. A wireless device, the wireless device comprising:
means for transmitting a request to add a user profile that is maintained at a remote wireless device;
means for receiving a response, associated with the request, from the remote wireless device;
means for determining from the response whether the request is accepted; and
means for transmitting the user profile in response to the request being accepted, the user profile to be stored in the remote wireless device.

29. The wireless device of claim 28, further comprising:
means for establishing a privacy setting associated with the remote wireless device.

30. The wireless device of claim 29, further comprising:
means for storing the privacy setting associated with the remote wireless device.

31. The wireless device of claim 29, further comprising:
means for transmitting the privacy setting to the remote wireless device.

32. The wireless device of claim 28, further comprising:
means for transmitting a notice to a server, wherein the notice indicates the remote wireless device accepted the request to add the user profile.

33. The wireless device of claim 28, further comprising:
means for determining whether any changes are made to the user profile; and
means for transmitting an update to a server, when changes are made to the user profile, wherein the update includes the changes to the user profile.

34. A non-transitory computer-readable medium comprising:
at least one instruction for transmitting a request to add a user profile to a remote wireless device;
at least one instruction to receive a response from the remote wireless device;
at least one instruction to determine whether the request is accepted; and
at least one instruction to transmit the user profile in response to the request being accepted, the user profile to be stored in the remote wireless device.

35. The non-transitory computer-readable medium of claim 34, further comprising:
at least one instruction to establish a privacy setting associated with the remote wireless device.

36. The non-transitory computer-readable medium of claim 35, further comprising:
at least one instruction to store the privacy setting associated with the remote wireless device.

37. The non-transitory computer-readable medium of claim 35, further comprising:
at least one instruction to transmit the privacy setting to the remote wireless device.

38. The non-transitory computer-readable medium of claim 34, further comprising:
at least one instruction to transmit a notice to a server, wherein the notice indicates the remote wireless device accepted the request to add the user profile.

39. The non-transitory computer-readable medium of claim 34, further comprising:
at least one instruction to determine whether any changes are made to the user profile; and at least one instruction to transmit an update to a server, when changes are made to the user profile, wherein the update includes the changes to the user profile.

40. A method of managing user profiles at a server, the method comprising:
   receiving, at the server, a user profile from a first wireless device, the user profile being associated with at least one other device;
   receiving notice at the server that a second wireless device accepts a request to add the user profile maintained at the second wireless device; and
   transmitting, from the server, the user profile to the second wireless device, the user profile to be stored in the second wireless device.

41. The method of claim 40, further comprising:
   receiving an update to the user profile from the first wireless device; and
   updating the user profile.

42. The method of claim 41, further comprising:
   storing at the server the updated user profile; and
   transmitting the updated user profile to the second wireless device.

43. A server for managing user profiles associated with wireless devices, the server comprising:
   a processor; and
   a memory accessible to the processor, the memory comprising:
      at least one instruction for receiving a user profile from a first wireless device, the user profile being associated with at least one other device;
      at least one instruction for receiving notice that a second wireless device accepts a request to add the user profile maintained at the second wireless device; and
      at least one instruction for transmitting the user profile to the second wireless device, the user profile to be stored in the second wireless device.

44. The server of claim 43, wherein the memory further comprises:
   at least one instruction for receiving an update to the user profile from the first wireless device; and
   at least one instruction for updating the user profile.

45. The server of claim 44, wherein the memory further comprises:
   at least one instruction for storing the updated user profile; and
   at least one instruction for transmitting the updated user profile to the second wireless device.

46. A server for managing user profiles associated with wireless devices, the server comprising:
   means for receiving a user profile from a first wireless device, the user profile being associated with at least one other device;
   means for receiving notice that a second wireless device accepts a request to add the user profile maintained at the second wireless device; and
   means for transmitting the user profile to the second wireless device, the user profile to be stored in the second wireless device.

47. The server of claim 46, further comprising:
   means for receiving an update to the user profile from the first wireless device; and
   means for updating to the user profile.

48. The server of claim 47, further comprising:
   means for storing the updated user profile; and
   means for transmitting the updated user profile to the second wireless device.

49. A non-transitory computer-readable medium comprising instructions, the instructions comprising:
   at least one instruction to receive a user profile from a first wireless device, the user profile being associated with at least one other device;
   at least one instruction to receive notice that a second wireless device accepts a request to add the user profile that is maintained at the second wireless device; and
   at least one instruction to transmit the user profile to the second wireless device, the user profile to be stored in the second wireless device.

50. The non-transitory computer-readable medium of claim 49, wherein the instructions further comprise:
   at least one instruction to receive an update to the user profile from the first wireless device;
   at least one instruction to update the user profile;
   at least one instruction to store the updated user profile; and
   at least one instruction to transmit the updated user profile to the second wireless device.

* * * * *

UNITED STATES PATENT AND TRADEMARK OFFICE
CERTIFICATE OF CORRECTION

| | | |
|---|---|---|
| PATENT NO. | : 8,755,794 B2 | Page 1 of 1 |
| APPLICATION NO. | : 12/328842 | |
| DATED | : June 17, 2014 | |
| INVENTOR(S) | : Virginia Walker Keating et al. | |

It is certified that error appears in the above-identified patent and that said Letters Patent is hereby corrected as shown below:

Title Page Inventors, (75), "Virgina Walker Keating" should read -Virginia Walker Keating- Signed and Sealed this
Sixteenth Day of September, 2014

Michelle K. Lee
*Deputy Director of the United States Patent and Trademark Office*